United States Patent
Kim et al.

(10) Patent No.: US 11,177,532 B2
(45) Date of Patent: Nov. 16, 2021

(54) POUCH-TYPE SECONDARY BATTERY HAVING GAS DISCHARGE MEANS

(71) Applicant: LG Chem, Ltd., Seoul (KR)

(72) Inventors: Sang Hun Kim, Daejeon (KR); Myung Hwan Kim, Daejeon (KR); Yong Su Choi, Daejeon (KR); Na Yoon Kim, Daejeon (KR); Hyung Kyun Yu, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/753,442

(22) PCT Filed: Jan. 24, 2019

(86) PCT No.: PCT/KR2019/001034
§ 371 (c)(1),
(2) Date: Apr. 3, 2020

(87) PCT Pub. No.: WO2019/208911
PCT Pub. Date: Oct. 31, 2019

(65) Prior Publication Data
US 2020/0321577 A1 Oct. 8, 2020

(30) Foreign Application Priority Data

Apr. 23, 2018 (KR) ........................ 10-2018-0046749

(51) Int. Cl.
*H01M 50/333* (2021.01)
*H01M 50/10* (2021.01)
(Continued)

(52) U.S. Cl.
CPC ......... *H01M 50/333* (2021.01); *H01M 50/10* (2021.01); *H01M 50/46* (2021.01); *H01M 50/531* (2021.01); *H01M 50/572* (2021.01)

(58) Field of Classification Search
CPC .. H01M 50/333; H01M 50/10; H01M 50/531; H01M 50/325; H01M 50/20; H01M 2/12; H01M 2/1276
See application file for complete search history.

(56) References Cited

U.S. PATENT DOCUMENTS 8,216,707 B2 7/2012 Byun et al.
9,331,322 B2 5/2016 Lee et al.
(Continued)

FOREIGN PATENT DOCUMENTS

DE 102014018751 A1 * 6/2016 .......... H01M 50/383
DE 102014018751 A1   6/2016
(Continued)

OTHER PUBLICATIONS

International Search Report for PCT/KR2019/001034 dated May 9, 2019.
(Continued)

*Primary Examiner* — Maria Laios
*Assistant Examiner* — Grace Ann Kenlaw
(74) *Attorney, Agent, or Firm* — Lerner, David, Littenberg, Krumholz & Mentlik, LLP

(57) ABSTRACT

A pouch-type secondary battery includes an electrode assembly including a positive electrode, a negative electrode, and a separator interposed therebetween, a pouch-type case configured to wrap around the electrode assembly, a first pair of insulative films disposed in a predetermined region of an edge of the pouch-type case, a positive electrode lead, one side of which is electrically connected to a positive electrode current collector of the electrode assembly and another side of which protrudes out of the case between the first films, a second pair of insulative films disposed in a predetermined region of the edge of the pouch-type case, a negative electrode lead, one side of which is electrically (Continued)

connected to a negative electrode current collector of the electrode assembly and another side of which protrudes out of the case between the second films, and a gas discharge member interposed between the first or second films.

21 Claims, 11 Drawing Sheets

(51) Int. Cl.
*H01M 50/46* (2021.01)
*H01M 50/531* (2021.01)
*H01M 50/572* (2021.01)

(56) References Cited

U.S. PATENT DOCUMENTS

| | | |
|---|---|---|
| 9,728,766 B2 | 8/2017 | Choi et al. |
| 10,141,553 B2 | 11/2018 | Kim et al. |
| 2010/0028724 A1 | 2/2010 | Byun et al. |
| 2014/0141292 A1 | 5/2014 | Lee et al. |
| 2016/0020452 A1 | 1/2016 | Choi et al. |
| 2016/0036024 A1 | 2/2016 | Choi et al. |
| 2016/0315301 A1* | 10/2016 | Kim .................. H01M 50/3425 |
| 2018/0114964 A1 | 4/2018 | Kim et al. |

FOREIGN PATENT DOCUMENTS

| | | |
|---|---|---|
| JP | 2006147370 A | 6/2006 |
| JP | 2016031934 A | 3/2016 |
| KR | 19980060805 A | 10/1998 |
| KR | 20100015161 A | 2/2010 |
| KR | 101245284 B1 | 3/2013 |
| KR | 101268296 B1 | 5/2013 |
| KR | 20130048419 A | 5/2013 |
| KR | 20140002120 A | 1/2014 |
| KR | 20160010823 A | 1/2016 |
| KR | 20160014828 A | 2/2016 |
| KR | 20160102615 A | 8/2016 |
| KR | 20160126157 A | 11/2016 |
| WO | 2017039126 A1 | 3/2017 |

OTHER PUBLICATIONS

Extended European Search Report including Written Opinion for EP19792234.7 dated Nov. 9, 2020; 8 pages.

* cited by examiner

【FIG. 1】
PRIOR ART
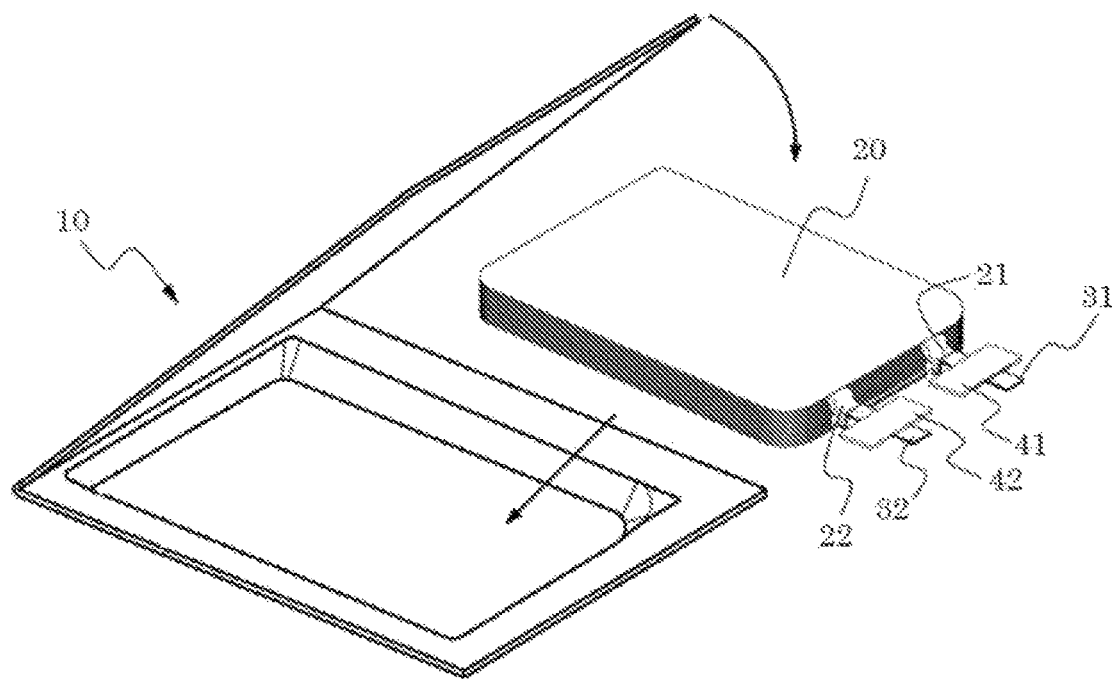

[FIG. 2]
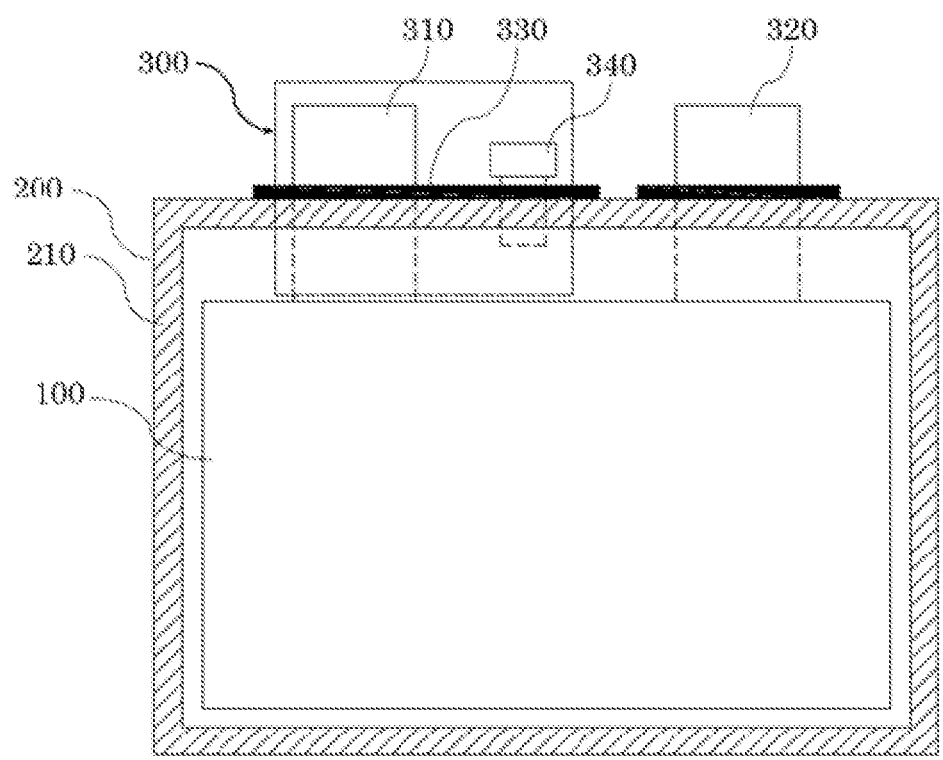

[FIG. 3]
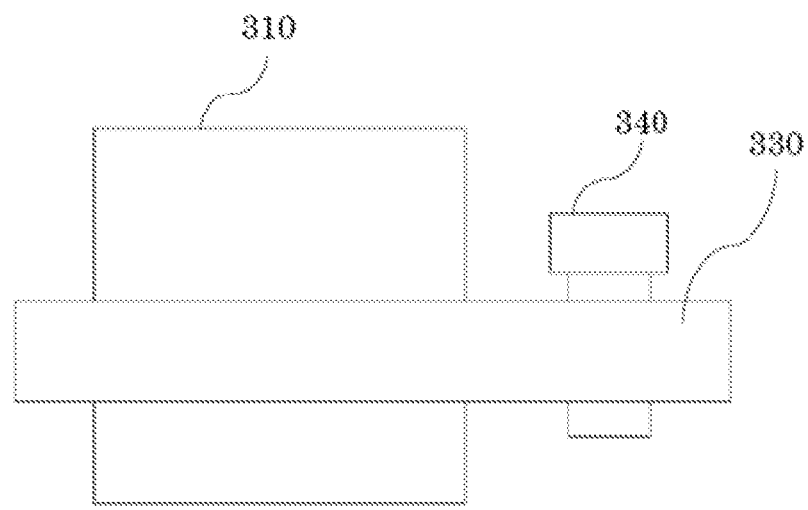
(a)
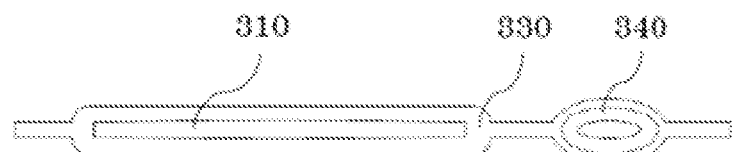
(b)

[FIG. 4]
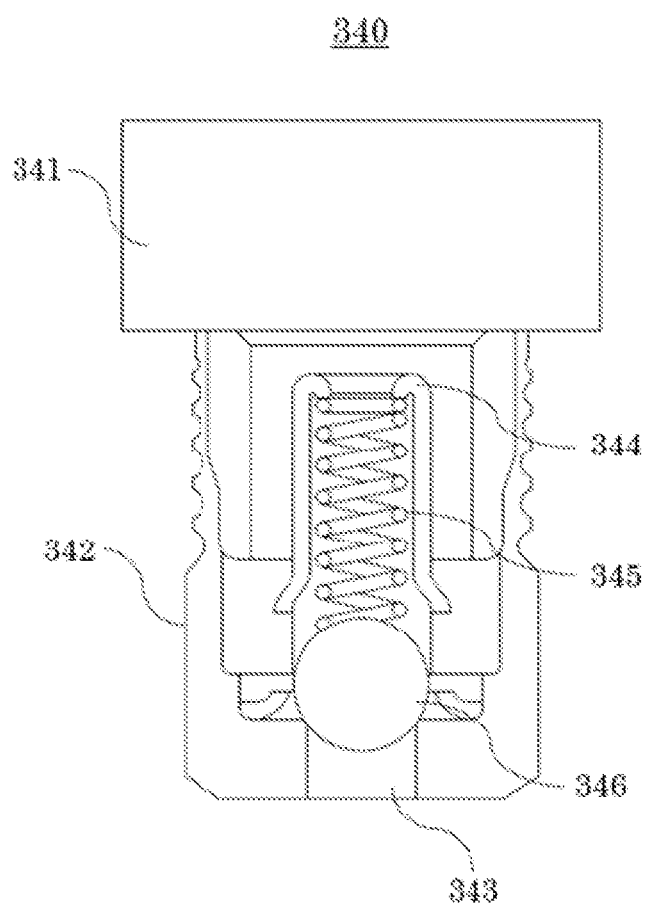

【FIG. 5】
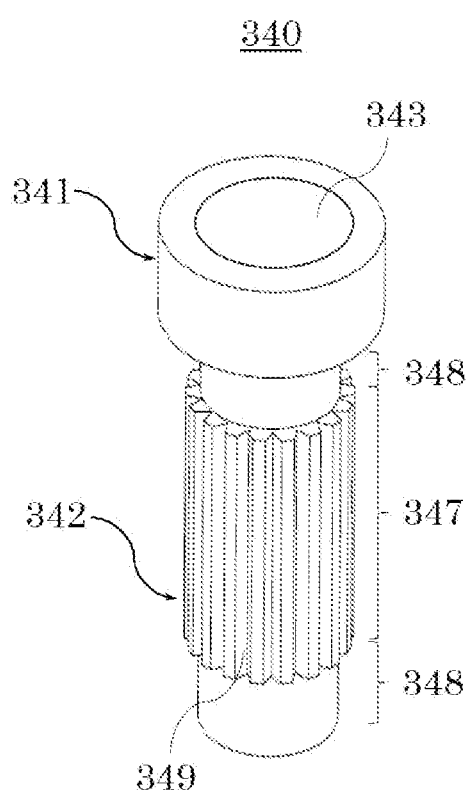

【FIG. 6】
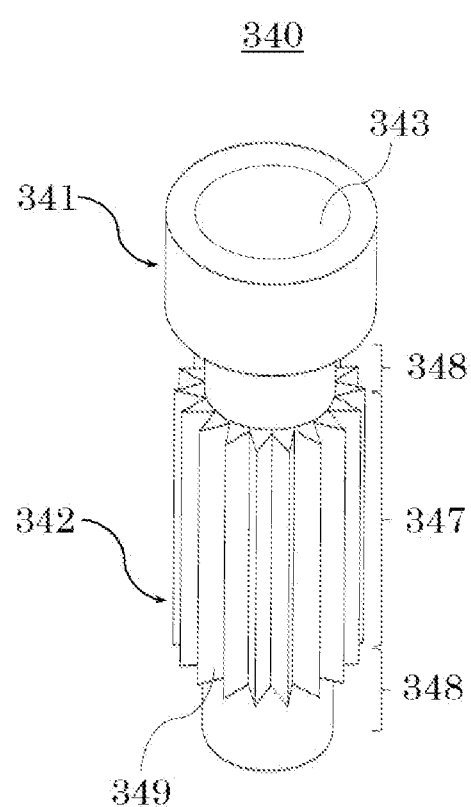

[FIG. 7]
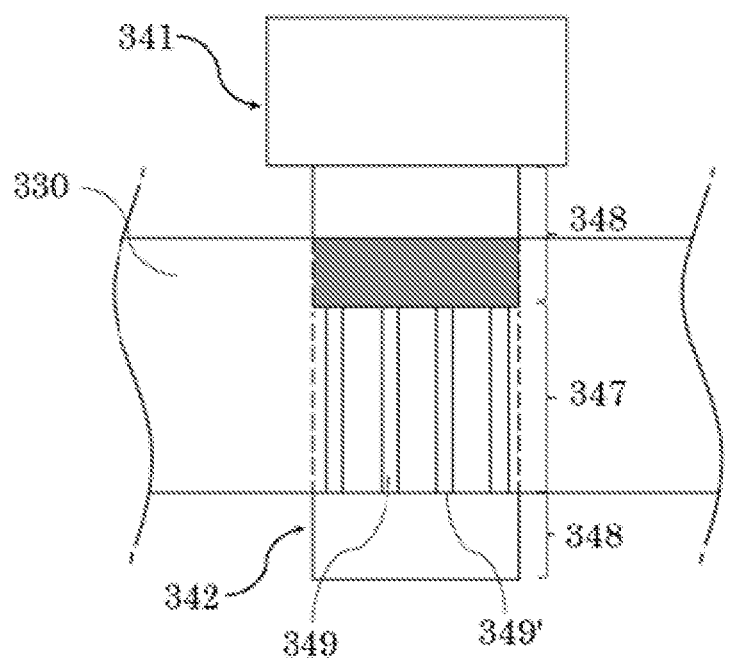

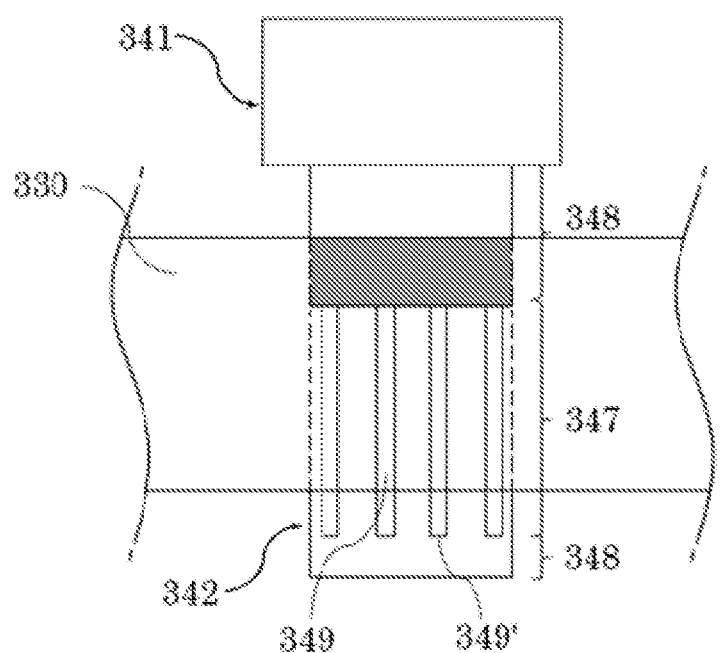
[FIG. 8]

[FIG. 9]
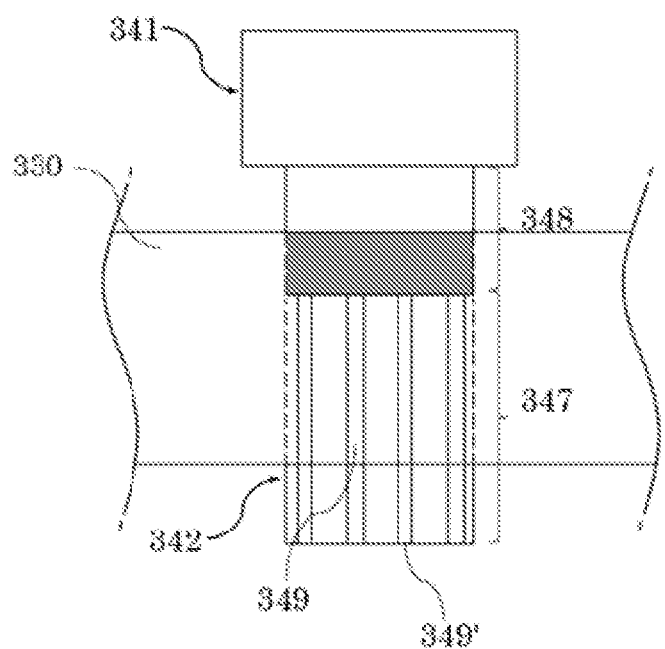

[FIG. 10]
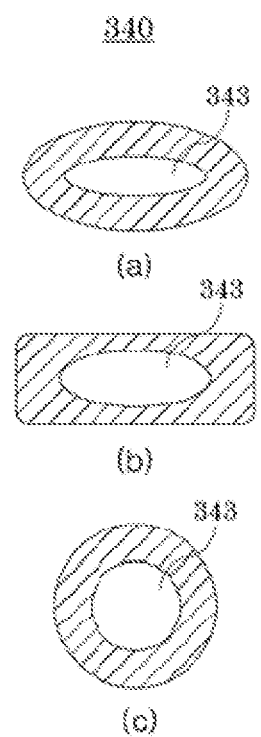

[FIG. 11]
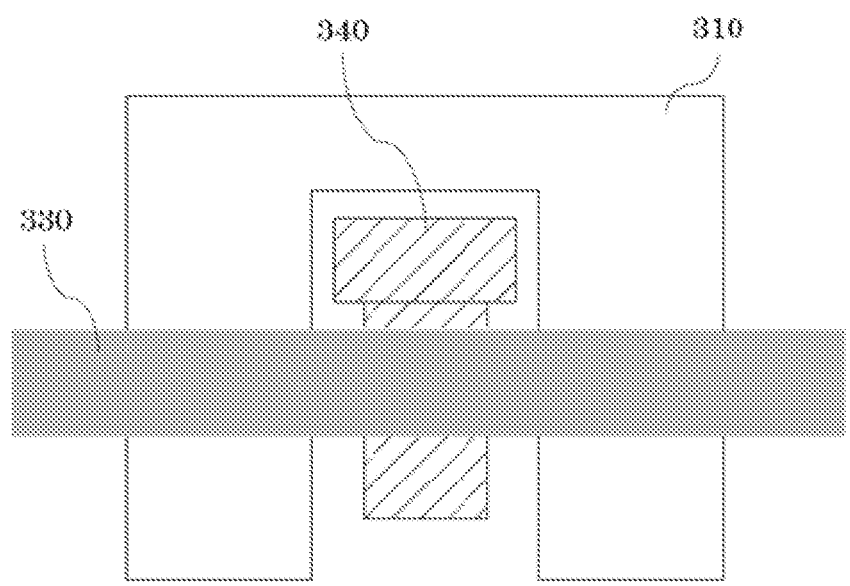

POUCH-TYPE SECONDARY BATTERY HAVING GAS DISCHARGE MEANS

CROSS-REFERENCE TO RELATED APPLICATIONS

This application is a national phase entry under 35 U.S.C. § 371 of International Application No. PCT/KR2019/001034, filed Jan. 24, 2019, published in Korean, which claims the benefit of priority to Korean Patent Application No. 10-2018-0046749 filed on Apr. 23, 2018, the disclosures of which are hereby incorporated by reference herein their entirety.

TECHNICAL FIELD

The present invention relates to a pouch-type secondary battery, and more particularly to a pouch-type secondary battery having a gas discharge means, wherein the gas discharge means is provided between a pair of insulative films, the gas discharge means being configured to discharge gas, whereby the swelling phenomenon and explosion of the battery are prevented.

BACKGROUND ART

As mobile devices have been continuously developed and the demand for mobile devices has increased, secondary batteries, which are capable of being charged and discharged, have been used as energy sources for various mobile devices. In addition, secondary batteries have also attracted considerable attention as energy sources for electric vehicles and hybrid electric vehicles, which have been presented as alternatives to existing gasoline and diesel vehicles using fossil fuels.

Based on the shape of a battery case, secondary batteries are classified into a cylindrical battery having an electrode assembly mounted in a cylindrical metal can, a prismatic battery having an electrode assembly mounted in a prismatic metal can, and a pouch-type battery having an electrode assembly mounted in a pouch-type case made of an aluminum laminate sheet.

The electrode assembly, which is mounted in the battery case, is a power generating element that is configured to have a structure including a positive electrode, a negative electrode, and a separator that is interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per unit weight.

As shown in FIG. 1, such a secondary battery is configured to have a structure in which an electrode assembly 20 is mounted in a pouch-type battery case 10 and in which positive and negative electrode tabs 21 and 22 are welded respectively to two electrode leads 31 and 32, which are exposed out of the battery case 10. In general, the edge of the case is sealed in the state in which a pair of insulative films 41 is attached to the upper surface and the lower surface of the electrode lead 31 and a pair of insulative films 42 is attached to the upper surface and the lower surface of the electrode lead 32.

Meanwhile, a secondary battery is charged and discharged through a process in which lithium ions from a lithium metal oxide of a positive electrode are repeatedly intercalated into a negative electrode, such as a graphite electrode, and the lithium ions are repeatedly deintercalated from the negative electrode. However, heat may be generated from such a secondary battery in the event of a short circuit in the secondary battery due to an external impact, overcharge of the secondary battery, or overdischarge of the secondary battery. As a result, an electrolyte may be decomposed in the secondary battery, and thermal runaway may occur in the secondary battery. That is, the safety of the secondary battery is compromised in several aspects. In particular, when the secondary battery is repeatedly charged and discharged, the electrolyte and an electrode active material electrochemically react with each other, and the explosion of the battery due to gas generated as the result of this electrochemical reaction has been noted as a very serious problem.

As an example of the conventional art for solving the above problem, Korean Patent Application Publication No. 10-2013-0048419 discloses a pouch-type secondary battery including an electrode assembly, a pouch-type case configured to receive the electrode assembly, upper and lower laminate sheets constituting the pouch-type case, a sealed portion formed by thermally fusing the upper and lower laminate sheets, positive and negative electrode tabs exposed from the sealed portion, and a safety vent having an alloy inserted between the upper and lower laminate sheet constituting the sealed portion, the alloy having a lower melting point than the sealed portion, the alloy being configured to melt at a predetermined temperature. This conventional art has an advantage in that, when the temperature of the secondary battery reaches a reference level, the safety vent is opened, whereby it is possible to prevent the battery from catching fire or exploding.

In order to open the safety vent, however, the internal temperature of the battery must necessarily increase. Furthermore, it is necessary to separately manufacture an alloy that is fusible at a required temperature. For these reasons, it is impossible to securely prevent the explosion of the battery, and in addition, manufacturing costs are inevitably increased.

DISCLOSURE

Technical Problem

The present invention has been made in view of the above problems, and it is an object of the present invention to provide a pouch-type secondary battery having a gas discharge means capable of securely discharging the gas generated in the battery to the outside.

It is another object of the present invention to provide a pouch-type secondary battery having a gas discharge means, wherein an increase in the cost of manufacturing the battery is minimized and the safety of the battery is secured.

Technical Solution

In accordance with the present invention, the above and other objects can be accomplished by the provision of a pouch-type secondary battery including an electrode assembly 100 including a positive electrode, a negative electrode, and a separator interposed between the positive electrode and the negative electrode, a pouch-type case 200 configured to wrap around the electrode assembly 100, a first pair of insulative films 330 disposed in a predetermined region of the edge of the pouch-type case 200 so as to face each other, a positive electrode lead 310, one side of which is electrically connected to a positive electrode current collector of the electrode assembly 100 and another side of which protrudes out of the pouch-type case 200 between the first pair of insulative films 330, a second pair of insulative films 330 disposed in a predetermined region of the edge of the pouch-type case 200 so as to face each other, a negative electrode lead 320, one side of which is electrically connected to a negative electrode current collector of the electrode assembly 100 and the other side of which protrudes out of the pouch-type case 200 between the second pair of insulative films 330, and a gas discharge member 340 interposed between the first pair of insulative films 330 or the second pair of insulative films 330, the gas discharge member being configured to discharge the gas generated in the pouch-type case 200 to the outside.

Also, in the pouch-type secondary battery according to the present invention, the gas discharge member 340 may include a body part 342, the body part being provided with a gas movement passageway 343, the interior of which is empty, the gas movement passageway being configured to discharge the gas generated in the pouch-type case 200 to the outside, a spring 345 located in the gas movement passageway 343, and a ball 346 abutting the spring 345 and configured to open and close the gas movement passageway 343.

Also, in the pouch-type secondary battery according to the present invention, a concave and convex portion 347 may be provided at the outer surface of the body part 342.

Also, in the pouch-type secondary battery according to the present invention, the concave and convex portion 347 may include at least one groove channel 349 formed in the longitudinal direction of the body part 342.

Also, in the pouch-type secondary battery according to the present invention, one side of the at least one groove channel 349 located in the inward direction of the pouch-type case 200 may not overlap the pair of insulative films 330 between which the gas discharge member is interposed such that the gas generated in the pouch-type case 200 is introduced into the at least one groove channel 349.

Also, in the pouch-type secondary battery according to the present invention, the concave and convex portion 347 may be provided only at a portion of the outer surface of the body part 342.

Also, in the pouch-type secondary battery according to the present invention, the concave and convex portion 347 may be provided in the longitudinal direction of the body part 342, and a non-concave and non-convex portion 348 may be provided at a predetermined position of the body part that is directed to the outside of the pouch-type case 200.

Also, in the pouch-type secondary battery according to the present invention, the concave and convex portion includes at least one groove channel formed in the longitudinal direction of the body part, and one side of the at least one groove channel 349, located in the inward direction of the pouch-type case, may not overlap the pair of insulative films 330 between which the gas discharge member is interposed, and the other side of the at least one groove channel 349, at which the non-concave and non-convex portion 348 is provided, may overlap the pair of insulative films 330 between which the gas discharge member is interposed such that the gas generated in the pouch-type case 200 is introduced into the at least one groove channel 349.

Also, in the pouch-type secondary battery according to the present invention, a portion of the at least one groove channel 349 that is located in the inward direction of the pouch-type case 200 may communicate with the interior of the pouch-type case 200 such that the gas generated in the pouch-type case 200 is introduced into the at least one groove channel 349.

Also, in the pouch-type secondary battery according to the present invention, a non-concave and non-convex portion 348 may be provided at a predetermined position of the body part 342 that is directed to the outside of the pouch-type case 200, the non-concave and non-convex portion being located so as to overlap the pair of insulative films 330 between which the gas discharge member is interposed.

Also, in the pouch-type secondary battery according to the present invention, the body part 342 may have any one of a circular section, an oval section, and a quadrangular section.

Also, in the pouch-type secondary battery according to the present invention, the gas discharge member 340 may be made of metal or plastic.

The pouch-type secondary battery according to the present invention may be applied to a battery module including a pouch-type secondary battery.

In addition, the battery module may be applied to a battery pack including a battery module.

DESCRIPTION OF DRAWINGS

FIG. 1 is an exploded perspective view showing a conventional pouch-type secondary battery.

FIG. 2 is a front view showing a pouch-type secondary battery having a gas discharge means according to a preferred embodiment of the present invention.

FIG. 3(a) is an enlarged front view showing a principal part of the pouch-type secondary battery shown in FIG. 2, and FIG. 3(b) is a plan view thereof.

FIG. 4 is a sectional view illustrating the interior structure of a gas discharge member according to a preferred embodiment of the present invention.

FIGS. 5 and 6 are perspective views respectively illustrating the exterior structures of gas discharge members according to first and second modifications of the present invention.

FIG. 7 is a view showing a first embodiment illustrating the state in which the gas discharge member shown in FIG. 5 and insulative films are joined to each other.

FIG. 8 is a view showing a second embodiment illustrating the state in which the gas discharge member shown in FIG. 5 and the insulative films are joined to each other.

FIG. 9 is a view showing a third embodiment illustrating the state in which the gas discharge member shown in FIG. 5 and the insulative films are joined to each other.

FIG. 10 is a view showing the sectional shape of the gas discharge member.

FIG. 11 is a view showing the state in which the gas discharge member and the insulative films are joined to each other based on a deformed lead member.

BEST MODE

In the present application, it should be understood that the terms "comprises," "has," or "includes," etc. specify the presence of features, integers, steps, operations, components, parts, or combinations thereof described in the specification, but do not preclude the presence or addition of one or more other features, integers, steps, operations, components, parts, or combinations thereof.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Hereinafter, a pouch-type secondary battery having a gas discharge means according to the present invention will be described with reference to the accompanying drawings.

FIG. 2 is a front view showing a pouch-type secondary battery having a gas discharge means according to a preferred embodiment of the present invention, FIG. 3(a) is an enlarged front view showing a principal part of the pouch-type secondary battery shown in FIG. 2, and FIG. 3(b) is a plan view thereof.

Referring to FIGS. 2 and 3, the pouch-type secondary battery according to the preferred embodiment of the present invention includes an electrode assembly 100, a pouch-type case 200, and a lead member 300.

The electrode assembly 100 may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed between the positive electrode and the negative electrode, a stack/folded type electrode assembly, which is configured to have a structure in which the unit cells are wound in the state in which the unit cells are disposed on a long separation film, or a laminated/stacked type electrode assembly, which is configured to have a structure in which the unit cells are stacked so as to be attached to each other in the state in which a separator is interposed between the unit cells. However, the present invention is not limited thereto.

The pouch-type case 200 is a case configured to receive the electrode assembly 100, and is generally configured to have a laminate sheet structure including an inner layer, a metal layer, and an outer layer.

The inner layer directly contacts the electrode assembly 100. For this reason, it is necessary for the inner layer to exhibit an insulation property and resistance to an electrolytic solution. In addition, for isolation from the outside, it is necessary for the inner layer to exhibit sealability. That is, it is necessary for a sealed portion, formed by thermally adhering inner layers, to exhibit excellent thermal adhesive strength.

The material for the inner layer may be selected from among a polyolefin-based resin, such as polypropylene, polyethylene, polyethylene acrylate, or polybutylene, a polyurethane resin, and a polyimide resin, which exhibit excellent chemical resistance and good sealability. However, the present invention is not limited thereto. Polypropylene, which exhibits excellent mechanical properties, such as tensile strength, rigidity, surface hardness, and impact resistance, as well as excellent chemical resistance, is the most preferable.

The metal layer, which abuts the inner layer, corresponds to a barrier layer configured to prevent the permeation of moisture or various kinds of gases from the outside into the battery. An aluminum thin film, which is lightweight and exhibits excellent formability, may be used as a preferred material for the metal layer.

The outer layer is provided at the other surface of the metal layer. The outer layer may be made of a heat-resistant polymer that exhibits excellent tensile strength, moisture permeation prevention capability, and air permeation prevention capability such that the outer layer exhibits heat resistance and chemical resistance while protecting the electrode assembly. In an example, the outer layer may be made of nylon or polyethylene terephthalate. However, the present invention is not limited thereto.

The case 200 of the present invention described above may be manufactured in various manners. For example, respective films of an inner layer, a metal layer, and an outer layer may be sequentially stacked, and may then be laminated to each other using dry lamination or extrusion lamination, whereby the case may be manufactured.

Meanwhile, a sealed portion 210 formed along the edge of the pouch-type case 200 is formed at all of four side surfaces of the pouch-type case in order to maintain the sealed state of the pouch-type secondary battery. After the electrode assembly 100 is received in the case 200, the case 200 may be thermally fused to form the sealed portion 210. However, it is obvious that the sealed portion 210 may be formed using methods that are usually used in the art to which the present invention pertains.

Leads, which generally include a positive electrode lead 310 and a negative electrode lead 320, are configured to have a structure in which a positive electrode tab (not shown) and a negative electrode tab (not shown), which are attached to the upper end of the electrode assembly 100, are electrically connected to the positive electrode lead 310 and the negative electrode lead 320, respectively, by welding and in which the leads are exposed out of the case 200.

At this time, as shown in FIG. 2, in order to assuredly secure insulativity and sealability, a first pair of insulative films 330, which face each other, is located in the region of the sealed portion 210 at which the positive electrode lead 310 is located, and a second pair of insulative films 330, which face each other, is located in the region of the sealed portion 210 at which the negative electrode lead 320 is located, and the positive and negative electrode leads 310 and 320 are disposed so as to extend between the respective insulative films 330.

Specifically, pressure becomes relatively high at the portions of the pouch-type case 200 that contact the positive and negative electrode leads 310 and 320 during the process of sealing the pouch-type case 200, whereby the possibility of the inner layer of the pouch-type case 200 being damaged may be increased. As a result, the pouch-type case 200 may not be securely sealed, which may lead to a defective product. In particular, in the case in which the inner layer of the pouch-type case 200 is damaged at the time of sealing, the metal layer, which directly abuts the inner layer, is directly exposed to the outside. The exposed portion of the metal layer may electrically contact the positive and negative electrode leads 310 and 320, whereby the possibility of occurrence of an accident, such as a short circuit, may be high.

In order to prevent the occurrence of poor sealing, which may be caused at the time of sealing the pouch-type case 200, as described above, and to secure electrical insulativity, therefore, a pair of insulative films 330 is located on the upper surface and the lower surface of each of the positive electrode lead 310 and the negative electrode lead 320.

Here, the material for the insulative films 330 may be one of a thermoplastic resin, a thermosetting resin, and a photocuring resin, which exhibit electrical insulativity. For example, the material for the insulative films may be a styrene-butadiene resin, a styrene resin, an epoxy resin, a urethane resin, an acrylic-based resin, a phenol resin, an amide-based resin, an acrylate-based resin, or a denatured resin thereof. However, the material for the insulative films is not particularly restricted, as long as the material is a resin that is capable of performing the above functions.

Between the first or second pair of insulative films 330 is interposed a gas discharge member 340 configured to discharge the gas generated in the pouch-type case 200 to the outside. One side of the gas discharge member 340 is located in the pouch-type case 200, and the other side of the gas discharge member 340 protrudes out of the respective insulative films 330. As previously described, a swelling phenomenon, in which gas, such as carbon dioxide or carbon monoxide, is generated in the secondary battery due to various kinds of causes, such as repeated charging and discharging, overcharging, or the occurrence of a short circuit, whereby the case swells, may occur in the battery. Depending on the circumstances, the battery may even explode.

The gas discharge member 340 is configured to discharge the gas generated in the pouch-type case 200 of the battery, as described above, to the outside. The interior structure of a gas discharge member according to a preferred embodiment of the present invention will be described in detail with reference to FIG. 4, which is a sectional view illustrating the interior structure of the gas discharge member.

The gas discharge member 340 according to the preferred embodiment of the present invention may be configured to have an approximate "T" shape including a head part 341 and a body part 342. Alternatively, the head part 341 may be omitted, whereby the gas discharge member may include only the body part 342.

The body part 342 is provided with a gas movement passageway 343 having a predetermined inner diameter such that the gas generated in the pouch-type case 200 is movable therethrough, and a spring 345 having an outer diameter slightly less than the inner diameter of the gas movement passageway is located such that one side of the spring is caught by a catching protrusion 344 provided in the vicinity of the opening side of the gas movement passageway 343 in such a manner that the movement of the spring is restricted. In addition, a ball 346 configured to open and close the gas movement passageway 343 is provided at the other side of the spring 345.

According to the gas discharge member 340 having the above construction, when the pressure in the pouch-type case 200 reaches a predetermined level, the ball 346 pushes the spring 345 upwards. As a result, the generated gas is discharged to the outside through the gas movement passageway 343, whereby the occurrence of a swelling phenomenon or the explosion of the battery may be prevented. Furthermore, in the case in which the generation of gas is caused by a temporary phenomenon, the spring 345 is restored, whereby the ball 346 closes the gas movement passageway 343 again. Consequently, it is possible to continuously use the secondary battery.

FIGS. 5 and 6 are perspective views respectively illustrating the exterior structures of gas discharge members according to first and second modifications of the present invention, and FIG. 7 is a view showing a first embodiment illustrating the state in which the gas discharge member shown in FIG. 5 and the insulative films are joined to each other.

The gas discharge member according to each of the modifications of the present invention is identical to the gas discharge member 340 shown in FIG. 4 in terms of the inner structure thereof, such as the gas movement passageway 343, the catching protrusion 344, the spring 345, and the ball 346, and is different from the gas discharge member shown in FIG. 4 only in terms of the external shape of the body part 342. Hereinafter, therefore, only the external shape of the body part will be described in detail.

The gas discharge member 340 according to each of the modifications of the present invention has a concave and convex portion 347 formed at a predetermined region of the outer surface of the body part 342. Specifically, as shown in FIGS. 5 and 6, a concave and convex portion 347, having at least one groove channel 349 formed in the longitudinal direction of the body part 342 such that gas is movable therealong, is preferably provided at the middle region of the outer surface of the body part 342, and smooth surfaces, i.e. non-concave and non-convex portions 348, are more preferably formed at the upper portion and the lower portion of the body part 342 such that the concave and convex portion 347 is located between the non-concave and non-convex portions 348.

In addition, as shown in FIG. 7, one end of the groove channel 349, which is directed inwards, is located on the same line as the lower edge of each of the insulative films 330 such that the gas generated in the pouch-type case 200 is introduced into the gas discharge member 340 having the concave and convex portion 347 formed between the non-concave and non-convex portions 348 described above.

Since the gas discharge member 340, having the concave and convex portion 347 and the non-concave and non-convex portions 348 provided at the outer surface of the body part 342, is interposed between the insulative films 330, as described above, it is possible to securely prevent the explosion of the secondary battery due to swelling. Since the gas discharge member 340 includes the ball 346 and the spring 345 in the gas movement passageway 343, as previously described, the gas discharge member 340 is capable of discharging gas to the outside when the pressure in the pouch-type case 200 reaches a predetermined level. However, the gas may not be discharged, and thus the pouch-type case may continuously swell due to the malfunction of the ball 346 or the spring 345. In particular, when a large amount of gas is continuously discharged, it is possible to prevent the explosion of the battery only in the case in which the sectional area of the gas movement passageway 343 is sufficiently large. Since the outer diameter of the gas discharge member 340 is preferably several tens of mm or less, more specifically 20 mm or less, in consideration of the characteristics of the secondary battery, however, restrictions are inevitably involved.

In contrast, as shown in FIG. 7, the insulative films 330 wrap around the protruding region of the concave and convex portion 347 in the state of being attached to the protruding region of the concave and convex portion 347, a groove channel inlet 349', which is directed to the inside of the pouch-type case 200, communicates with the interior of the pouch-type case 200, and the insulative films 330 tightly contact the surface of the non-concave and non-convex portion 348 that is directed to the outside of the pouch-type case 200. Even in the case in which the pressure in the pouch-type case 200 abruptly increases, therefore, the gas introduced through the groove channel inlet 349' moves along the groove channel 349, and the non-concave and non-convex portion 348 and the insulative films 330, which have relatively low adhesive force therebetween, are separated from each other first, whereby the gas is discharged to the center of the non-concave and non-convex portion 348, or the gas discharge member 340 is separated from the insulative films 330. Consequently, it is possible to prevent the occurrence of a large-scale accident.

Meanwhile, the concave and convex portion 347 is shown as protruding from the outer surface of the body part 342 in FIGS. 5 and 6. Alternatively, the concave and convex portion 347 may be formed in the outer surface of the body part 342 in a depressed state.

In addition, the gas discharge member 340 may be made of metal or plastic. More preferably, the gas discharge member 340 is made of metal, which exhibits relatively high sealability.

Next, FIG. 8 is a view showing a second embodiment illustrating the state in which the gas discharge member shown in FIG. 5 and the insulative films are joined to each other. In the second embodiment, one end of the groove channel 349 extends below the lower edge of each of the insulative films 330, i.e. to the interior of the case 200. According to the second embodiment, a portion of the groove channel 349, including the groove channel inlet 349', is in a fully open state. As a result, gas is more easily movable, and it is not necessary to accurately align the lower edge of each of the insulative films 330 with one end of the groove channel 349, whereby manufacturing is easy.

FIG. 9 is a view showing a third embodiment illustrating the state in which the gas discharge member shown in FIG. 5 and the insulative films are joined to each other, wherein one end of the groove channel 349 is located below the lower edge of each of the insulative films 330, and in addition, one end of the groove channel 349 extends to the end of the body part 342. The third embodiment has advantages similar to the advantages of the second embodiment, and therefore a detailed description thereof will be omitted.

Meanwhile, as shown in FIG. 10, the section of the gas discharge member 340 may be circular, oval, or quadrangular.

FIG. 11 is a view showing the state in which the gas discharge member and the insulative films are joined to each other based on a deformed lead member, wherein the positive electrode lead 310 and/or the negative electrode lead 320 may be configured in a shape in which the left surface, the right surface, and the upper surface thereof surround the gas discharge member 340.

In the case in which the gas discharge member 340 is disposed in the above structure, it is possible to minimize loss of the volume of a battery pack even in the case in which the gas discharge member 340 is added, since the positive and negative electrode leads are identical to existing positive and negative electrode leads, whereby it is possible to increase the energy density of the battery pack. Furthermore, the gas discharge member 340 according to the present invention is also applicable to a battery in which the gas discharge member 340 is separately provided. In addition, there is an advantage that manufacturing is possible even though production facilities are not greatly changed.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Electrode assembly
200: Pouch-type case
210: Sealed portion
300: Lead member
310: Positive electrode lead
320: Negative electrode lead
330: Insulative films
340: Gas discharge member
341: Head part
342: Body part
343: Gas movement passageway
344: Catching protrusion
345: Spring
346: Ball
347: Concave and convex portion
348: Non-concave and non-convex portion
349: Groove channel
349': Groove channel inlet

INDUSTRIAL APPLICABILITY

In the pouch-type secondary battery according to the present invention, a gas discharge member is interposed between a pair of insulative films, whereby it is possible to discharge the gas generated in the battery to the outside and thus it is possible to prevent the occurrence of a swelling phenomenon or the explosion of the battery.

Also, in the pouch-type secondary battery according to the present invention, the gas discharge member, which is interposed between the pair of insulative films, is provided at the outer surface thereof with a concave and convex portion and a non-concave and non-convex portion. Even in the case in which a large amount of gas is generated, the non-concave and non-convex portion and the insulative films, which have relatively low adhesive strength therebetween, are separated from each other, and the gas is discharged to the outside. Consequently, it is possible to remarkably reduce the danger of explosion of the battery.

The invention claimed is:
1. A pouch-type secondary battery comprising:
an electrode assembly comprising a positive electrode, a negative electrode, and a separator interposed between the positive electrode and the negative electrode;
a pouch-type case configured to wrap around the electrode assembly;
a first pair of insulative films disposed in a predetermined region of an edge of the pouch-type case so as to face each other;
a positive electrode lead, one side of which is electrically connected to a positive electrode current collector of the electrode assembly and another side of which protrudes out of the pouch-type case between the first pair of insulative films;
a second pair of insulative films disposed in a predetermined region of the edge of the pouch-type case so as to face each other;

a negative electrode lead, one side of which is electrically connected to a negative electrode current collector of the electrode assembly and another side of which protrudes out of the pouch-type case between the second pair of insulative films; and a gas discharge member interposed between the first pair of insulative films or the second pair of insulative films, the gas discharge member being configured to discharge gas generated in the pouch-type case to an outside, wherein the gas discharge member comprises a body part, the body part being provided with a gas movement passageway, an interior of which is empty, the gas movement passageway being configured to discharge the gas generated in the pouch-type case to the outside, a spring located in the gas movement passageway, and a ball abutting the spring and configured to open and close the gas movement passageway, wherein the body part is further provided with a concave and convex portion, which is formed at an outer surface thereof, wherein the concave and convex portion comprises at least one groove channel formed in a longitudinal direction of the body part, and wherein one side of the at least one groove channel located in an inward direction of the pouch-type case does not overlap the pair of insulative films between which the gas discharge member is interposed such that the gas generated in the pouch-type case is introduced into the at least one groove channel.

2. The pouch-type secondary battery according to claim 1, wherein the body part has any one of a circular section, an oval section, and a quadrangular section.

3. The pouch-type secondary battery according to claim 1, wherein the gas discharge member is made of metal or plastic.

4. The pouch-type secondary battery according to claim 1, wherein one of the positive electrode lead and the negative electrode lead has a left surface, a right surface, and an upper surface that surround the gas discharge member.

5. A battery module comprising the pouch-type secondary battery according to claim 1.

6. A battery pack comprising the battery module according to claim 5.

7. A pouch-type secondary battery comprising:
an electrode assembly comprising a positive electrode, a negative electrode, and a separator interposed between the positive electrode and the negative electrode;
a pouch-type case configured to wrap around the electrode assembly;
a first pair of insulative films disposed in a predetermined region of an edge of the pouch-type case so as to face each other;
a positive electrode lead, one side of which is electrically connected to a positive electrode current collector of the electrode assembly and another side of which protrudes out of the pouch-type case between the first pair of insulative films;
a second pair of insulative films disposed in a predetermined region of the edge of the pouch-type case so as to face each other;
a negative electrode lead, one side of which is electrically connected to a negative electrode current collector of the electrode assembly and another side of which protrudes out of the pouch-type case between the second pair of insulative films;

a gas discharge member interposed between the first pair of insulative films or the second pair of insulative films, the gas discharge member being configured to discharge gas generated in the pouch-type case to an outside, wherein the gas discharge member comprises a body part, the body part being provided with a gas movement passageway, an interior of which is empty, the gas movement passageway being configured to discharge the gas generated in the pouch-type case to the outside, a spring located in the gas movement passageway, and a ball abutting the spring and configured to open and close the gas movement passageway, wherein the body part is further provided with a concave and convex portion, which is formed at an outer surface thereof, the outer surface extending in a longitudinal direction of the body part, and wherein the concave and convex portion is provided only at a portion of the outer surface of the body part.

8. The pouch-type secondary battery according to claim 7, wherein a non-concave and non-convex portion is provided at a predetermined position of the body part that is directed to an outside of the pouch-type case.

9. The pouch-type secondary battery according to claim 8, wherein the concave and convex portion comprises at least one groove channel formed in the longitudinal direction of the body part, wherein one side of the at least one groove channel, located in an inward direction of the pouch-type case, does not overlap the pair of insulative films between which the gas discharge member is interposed, and the other side of the at least one groove channel, at which the non-concave and non-convex portion is provided, overlaps the pair of insulative films between which the gas discharge member is interposed such that the gas generated in the pouch-type case is introduced into the at least one groove channel.

10. The pouch-type secondary battery according to claim 7, wherein the body part has any one of a circular section, an oval section, and a quadrangular section.

11. The pouch-type secondary battery according to claim 7, wherein the gas discharge member is made of metal or plastic.

12. The pouch-type secondary battery according to claim 7, wherein one of the positive electrode lead and the negative electrode lead has a left surface, a right surface, and an upper surface that surround the gas discharge member.

13. A battery module comprising the pouch-type secondary battery according to claim 7.

14. A battery pack comprising the battery module according to claim 13.

15. A pouch-type secondary battery comprising:
an electrode assembly comprising a positive electrode, a negative electrode, and a separator interposed between the positive electrode and the negative electrode;
a pouch-type case configured to wrap around the electrode assembly;
a first pair of insulative films disposed in a predetermined region of an edge of the pouch-type case so as to face each other;
a positive electrode lead, one side of which is electrically connected to a positive electrode current collector of the electrode assembly and another side of which protrudes out of the pouch-type case between the first pair of insulative films;
a second pair of insulative films disposed in a predetermined region of the edge of the pouch-type case so as to face each other;

a negative electrode lead, one side of which is electrically connected to a negative electrode current collector of the electrode assembly and another side of which protrudes out of the pouch-type case between the second pair of insulative films; and a gas discharge member interposed between the first pair of insulative films or the second pair of insulative films, the gas discharge member being configured to discharge gas generated in the pouch-type case to an outside, wherein the gas discharge member comprises a body part, the body part being provided with a gas movement passageway, an interior of which is empty, the gas movement passageway being configured to discharge the gas generated in the pouch-type case to the outside, a spring located in the gas movement passageway, and a ball abutting the spring and configured to open and close the gas movement passageway, wherein the body part is further provided with a concave and convex portion, which is formed at an outer surface thereof, wherein the concave and convex portion comprises at least one groove channel formed in a longitudinal direction of the body part, and wherein a portion of the at least one groove channel that is located in an inward direction of the pouch-type case communicates with an interior of the pouch-type case such that the gas generated in the pouch-type case is introduced into the at least one groove channel.

16. The pouch-type secondary battery according to claim 15, wherein a non-concave and non-convex portion is provided at a predetermined position of the body part that is directed to an outside of the pouch-type case, the non-concave and non-convex portion being located so as to overlap the pair of insulative films between which the gas discharge member is interposed.

17. The pouch-type secondary battery according to claim 15, wherein the body part has any one of a circular section, an oval section, and a quadrangular section.

18. The pouch-type secondary battery according to claim 15, wherein the gas discharge member is made of metal or plastic.

19. The pouch-type secondary battery according to claim 15, wherein one of the positive electrode lead and the negative electrode lead has a left surface, a right surface, and an upper surface that surround the gas discharge member.

20. A battery module comprising the pouch-type secondary battery according to claim 15.

21. A battery pack comprising the battery module according to claim 20.

* * * * *